Sept. 3, 1963 A. DEKKER 3,102,577
CRUDE-OIL BURNERS
Filed April 5, 1960

INVENTOR
Arien Dekker

United States Patent Office 3,102,577
Patented Sept. 3, 1963

3,102,577
CRUDE-OIL BURNERS
Arien Dekker, Naarden, Netherlands
Filed Apr. 5, 1960, Ser. No. 24,865
3 Claims. (Cl. 158—66)

The invention relates to improvements in atmospheric crude-oil burners, especially for small central heating boilers that will be operated by natural draft without the use of motors and other moving parts and is an improvement upon the burners shown in my Patents Nos. 2,367,460 and 2,671,505.

One object of the invention is to obtain a greater capacity of the burner without enlarging its diameter. Another object is automatical operation of the burner.

Therefore, the evaporation pan of the burner has two gas outlet slits, each with its own separate supply of combustion air.

Figure 1:
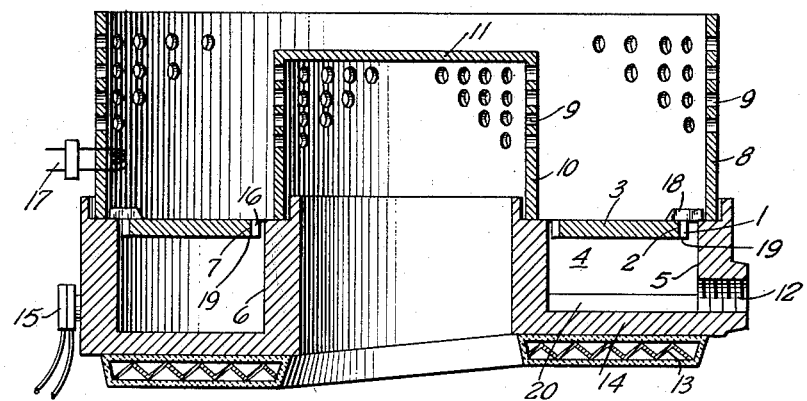
Figure 2:
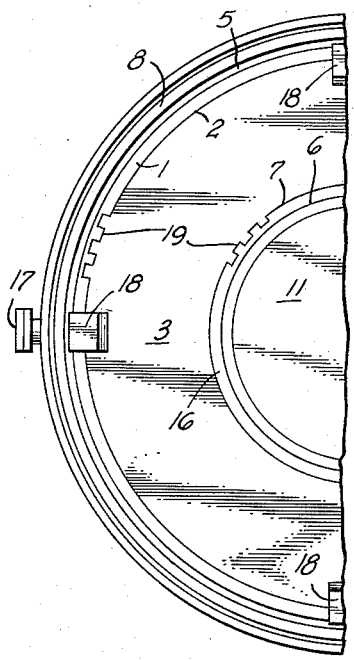
Figure 3:
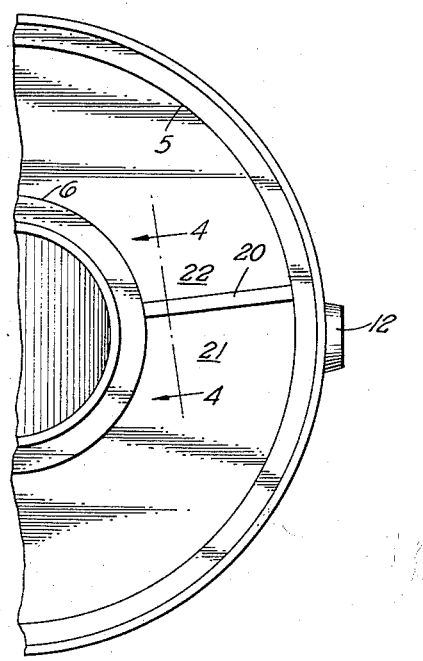

In the accompanying drawing, FIG. 1 is a sectional elevation of an embodiment of this invention. FIG. 2 is a partial plan view. FIG. 3 is a partial plan view without the cover 3 and FIG. 4 a vertical section taken along the line 4—4 of FIG. 3.

The present burner has two annular gas outlet slits, one 1 between the outerwall 2 of the cover 3 of the annular evaporation pan 4 and the outerwall 5 of said pan and one 16 between the innerwall 7 of the cover 3 and the innerwall 6 of the pan 4. The cover 3 has at its periphery lugs 18 seated on the outerwall 5 of the pan 4 to carry said cover. The walls 5 and 6 have vertical extensions 8 and 10 provided with holes 9 for the supply of combustion air to the gas, which passes through the slits 1 and 16 from the evaporation pan 4. The extension 10 has a cover 11. The pan 4 has a horizontal oil supply 12 at its outerwall 5. The pan 4 is heated by a heating element 13 under and against the bottom 14 of said pan, said element 13 being connected with a suitable source of electric current. A bi-metal thermostat 15 is fixed to the outerwall 5 of the pan 4 to control the supply of electric current to the element 13 in such a manner that the temperature of the bottom 14 of the pan 4 is maintained between a certain minimum and maximum. There is an electric ignitor means 17 above one of the gas-outlets connected with a suitable source of electric current. The ignitor means 17 and the oil supply to the oil-inlet 12 may be connected with appropriate control means.

Figure 4:
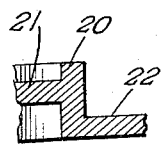

The evaporation pan 4 as shown in the drawing has a sloping bottom, with a ridge 20 between its highest edge 21 and its lowest one 22, as shown in FIG. 4, to prevent formation of deposit on the bottom near the oil inlet hole 12.

The gas outlet slits 1 and 16 can be provided with ribs 19 at one of its walls to prevent wholly or partly closing of said slits by unequal expansion of the walls of the evaporation pan 4 and its cover 3 owing to difference in temperature.

The burner is pressed by means of a suitable support (not shown) against the bottom of the combustion chamber of a boiler (not shown), which has to be heated.

Operation of the burner is obtained by closing the electric circuit for the supply of electric current to the heating element 13 for heating the evaporation pan.

As soon as said pan has acquired a temperature sufficient to vaporise oil, a supply of oil to the evaporation pan is opened and the electric circuit of the electric igniter 17 is closed by appropriate control.

The oil flows upon the bottom of the evaporation pan and is vaporised. As soon as oil-vapour escapes through the slits it is ignited by the electric igniter 17.

The temperature of the pan continues to rise and when said pan has acquired a temperature sufficient to assure a reliable operation of the burner the thermostat 15 opens the electric circuit of the heating element 13.

If for some reason, f.i., a small supply of oil, the temperature of the pan becomes too low to vaporise the oil on its bottom the electric circuit of the heating element 13 is closed again by means of the thermostat 15.

What I claim is:

1. In an oil burner comprising an annular evaporation pan having spaced annular inner and outer walls provided with an annular cover disposed over said space the combination of two annular slit-shaped gas outlets, one between the outerwall of the cover and the outerwall of the evaporation pan and one between the innerwall of the cover and the innerwall of the evaporation pan, each gas outlet having its own separate supply of combustion air through holes in vertical extensions of both walls of the evaporation pan, the extension of the innerwall of the pan being provided with a cover, a horizontal hole in the outerwall of the evaporation pan for the supply of oil, an electric heating element under and against the bottom of the evaporation pan, a bi-metal thermostat against the outerwall of the evaporation pan to control the supply of electric current to the heating element in order to maintain the temperature of the evaporation pan between a certain minimum and maximum, an electric igniter above one of the annular gas-outlet slits.

2. An oil burner as per claim 1, in which the evaporation pan has a sloping bottom with a ridge between its highest and lowest end.

3. An oil burner as per claim 2, in which the gas-outlet slits have ribs at one of their walls.

References Cited in the file of this patent
UNITED STATES PATENTS

| | | |
|---|---|---|
| 1,855,758 | Hill et al. | Apr. 26, 1932 |
| 1,933,044 | Cannon | Oct. 31, 1933 |
| 2,647,567 | Ciglia | Aug. 4, 1953 |